US005459367A

United States Patent [19]

Davis

[11] Patent Number: 5,459,367

[45] Date of Patent: Oct. 17, 1995

[54] COLLECTOR ELEMENT FOR THERMIONIC ELECTRIC CONVERTERS

[76] Inventor: Edwin D. Davis, 1350 S. Peninsula Dr., Daytona Beach, Fla. 32118

[21] Appl. No.: 351,634

[22] Filed: Dec. 7, 1994

[51] Int. Cl.$^6$ .......... H02N 10/00

[52] U.S. Cl. .......... 310/306

[58] Field of Search .......... 310/306; 322/2 R; 376/321; 313/310

[56] References Cited

U.S. PATENT DOCUMENTS

| | | | |
|---|---|---|---|
| Re. 24,879 | 9/1960 | Caldwell | 310/306 |
| 3,079,527 | 2/1963 | Opfermann | 322/2 |
| 3,089,079 | 5/1963 | Milligan | 322/2 |
| 3,312,840 | 4/1967 | Gabor | 310/306 |
| 3,328,611 | 6/1967 | Davis | 310/4 |
| 3,519,854 | 7/1970 | Davis | 310/4 |
| 4,281,280 | 7/1981 | Richards | 310/306 |
| 4,303,845 | 12/1981 | Davis | 310/306 |
| 4,323,808 | 4/1982 | Davis | 310/306 |

*Primary Examiner*—Clayton E. LaBalle
*Attorney, Agent, or Firm*—Kerkam, Stowell, Kondracki & Clarke; William L. Feeney

[57] ABSTRACT

A collector element for a thermionic electric converter that reduces electron scatter and improves conversion efficiency is provided. The collector element includes an outer casing and a highly charged member surrounded by insulating layers that minimize loss of static charge on the highly charged member. The collector element additionally includes a conductive layer of copper sulfate gel impregnated with copper wool fibers. Copper sulfate gel minimizes electron scatter, while providing advantageous electrical properties. The copper wool fibers are in electrical contact with a plurality of ancillary buses which transmit electrical energy to a main bus that provides the electrical energy collected to an external circuit. The main bus is also in electrical contact with the conductive layer.

10 Claims, 5 Drawing Sheets

COLLECTOR ELEMENT FOR THERMIONIC ELECTRIC CONVERTERS

FIELD OF THE INVENTION

The present invention relates generally to the field of converting heat energy directly to electrical energy, and more particularly to an improved collection anode for a device which converts heat energy directly to electrical energy.

BACKGROUND OF THE INVENTION

Heretofore, there have been known thermionic converters such as those shown in U.S. Pat. Nos. 3,519,854, 3,328,611, 4,303,845 and 4,323,808 (all to the inventor of the present invention), which disclose various apparatus and methods for the direct conversion of thermal energy to electrical energy. In U.S. Pat. No. 3,519,854, there is described a converter using Hall effect techniques as the output current collection means. The '854 patent teaches use of a stream of electrons boiled off of an emissive cathode surface as the source of electrons. The electrons are accelerated toward an anode positioned beyond the Hall effect transducer. The anode of the '854 patent is a simple charged metallic plate.

U.S. Pat. No. 3,328,611 discloses a spherically configured thermionic converter, wherein a spherical emissive cathode is supplied with heat, thereby emitting electrons to a concentrically positioned, spherical anode under the influence of a control member and having a high positive potential thereon. As with the '854 patent, the anode of the '611 patent is simply a charged metallic surface.

U.S. Pat. No. 4,303,845 discloses a thermionic converter wherein the electron stream from the cathode passes through an air core induction coil located within a transverse magnetic field, thereby generating an EMF in the induction coil by interaction of the electron stream with the transverse magnetic field. The anode of the '845 patent also comprises a charged metallic plate.

U.S. Pat. No. 4,323,808 discloses a laser-excited thermionic converter that is very similar to the thermionic converter disclosed in the '845 patent. The main difference is that the '808 patent discloses using a laser which is applied to a grid on which electrons are collected at the same time the potential to the grid is removed, thereby creating electron boluses that are accelerated toward the anode through an air core induction coil located within a transverse magnetic field. The anode of the '808 patent is the same as that disclosed in the '845 patent, i.e., simply a charged metallic plate.

It has been found that using a metallic plate as the anode has several associated disadvantages. These disadvantages include unwanted electron scatter occurring when the electron beam or bolus contacted the anode. Electron scatter acts to neutralize the static charge built up on the charged member, thereby reducing the acceleration and amount of electrons attracted to the anode. Thus, electron scatter can act to eventually cause the anode to cease attracting electrons, thereby destroying the function of the anode and rendering the converter inoperable.

SUMMARY OF THE INVENTION

In view of the foregoing, what is needed is a collector element, or anode, for a thermionic converter that will minimize electron scatter and more efficiently collect electrons and to convert thermal energy directly to electric energy.

Therefore, it is an object of the present invention to provide an anode that provides the advantageous conductive properties of a metal anode while minimizing electron scatter.

It is another object of the present invention to provide a thermionic electric converter for providing improved heat to electric conversion efficiency.

Therefore, in order to provide these and other objectives and to overcome the deficiencies set forth above with respect to prior thermionic converter anode configurations, a collector element for a thermionic converter having a generally circular cross-section is provided, comprising: a casing element for housing the collector element; a first insulative layer disposed adjacent to an inner periphery of the casing element; a charged member disposed adjacent an inner periphery of the first insulative layer, said charged member holding a static charge for attracting and accelerating electrons toward the anode from a cathode; a second insulative layer disposed adjacent an inner periphery of said charged member, thereby isolating said charged member from remaining elements of the collector element; a conductive layer disposed adjacent an inner periphery of the second insulative layer; a plurality of conductive buses disposed within said conductive layer; and a main bus in electrical connection with the conductive layer and the plurality of conductive buses, the main bus collecting electrical energy captured by the anode.

The conductive layer of the collector element is made up of materials that will minimize or prevent electron scatter within a device such as a thermionic converter. Electron scatter acts to neutralize the static charge built up on the charged member, thereby reducing the acceleration and amount of electrons attracted to the anode. Thus, electron scatter can act to eventually cause the anode to cease attracting electrons, thereby destroying the function of the anode and rendering the converter inoperable.

In order to minimize the effects of electron scatter, the conductive element of the present invention is made up of a copper sulfate gel impregnated with copper wool. Copper sulfate gel has conductive properties similar to those of the metallic plates of earlier thermionic converters, with the added feature that it minimizes electron scatter, thus enhancing the operational ability of the collector element. The copper wool fibers impregnating the copper sulfate gel act as conduits for captured electrical energy exerted by the electrons on the anode. These copper wool fibers are in electrical contact with, and conduct electrical energy to, a number of ancillary buses, which, in turn, are electrically connected to a main bus which supplies the collected electrical energy to an external circuit where work can be performed using the collected electrical energy. The main bus is also in electrical connection with the copper sulfate gel, thereby increasing the efficiency of the electrical collection portion of a thermionic converter using the anode of the present invention.

Therefore, in addition to reducing the dilatory effects of electron scatter, the collector element of the present invention also functions to more efficiently gather electrical energy to perform work. This is accomplished by conducting the electrical energy of the electrons which have already created EMF in the induction coils of the thermionic converter and using these electrons to perform work and regenerate electron emission at the cathode of the thermionic electric converter.

BRIEF DESCRIPTION OF THE DRAWINGS

The invention will be described in detail herein with reference to the following figures in which like reference numerals denote like elements, and wherein.

DETAILED DESCRIPTION OF THE PREFERRED EMBODIMENT

Figure 1:
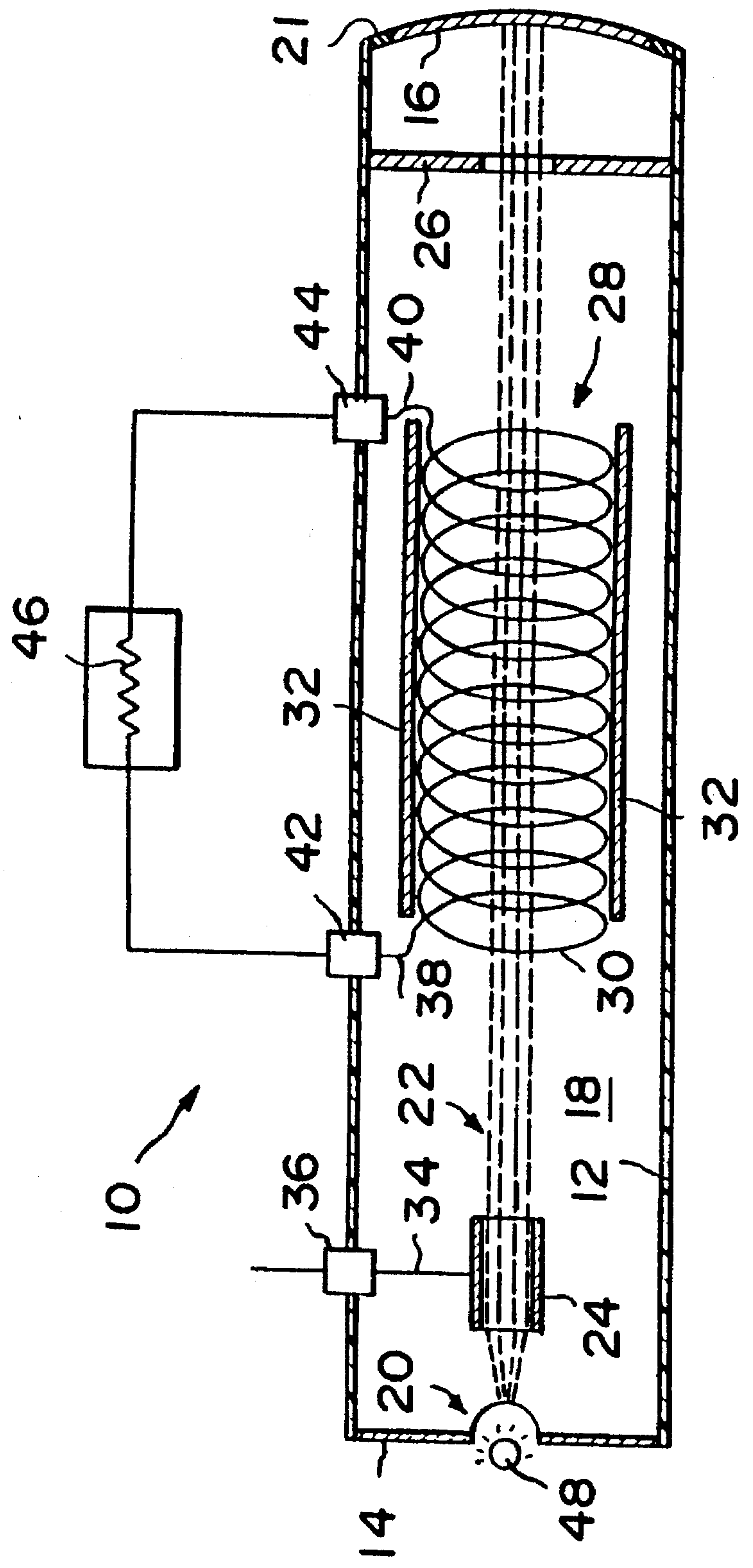
FIG. 1 PRIOR ART
FIG. 1 is a schematic diagram of a prior art thermionic electric converter.
Figure 2:
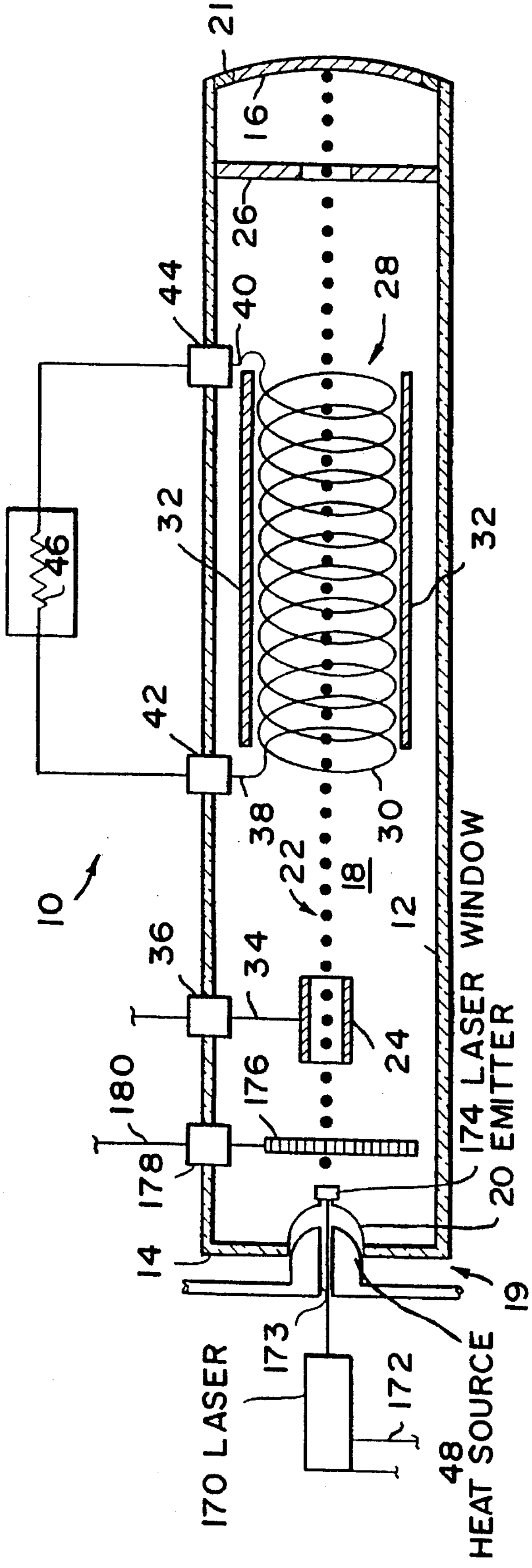
FIG. 2 PRIOR ART
FIG. 2 is a schematic diagram of a prior art laser-excited thermionic electric converter.

FIGS. 1 and 2 show prior art thermionic electric converters as shown and described in U.S. Pat. Nos. 4,303,845 and 4,323,808, respectively, both to Edwin D. Davis, the inventor of the present invention, the disclosures of which are incorporated by reference herein in their entirety. While the operation of both thermionic converters is described in detail in the incorporated patents, a general operational overview is presented herein with reference to FIGS. 1 and 2.

FIG. 1 shows a basic thermionic electric converter. FIG. 2 shows a laser-excited thermionic converter. The operation of both converters is very similar.

With reference to the Figures, a basic thermionic electric converter 10 is shown. The converter 10 has an elongated, cylindrically shaped outer housing 12 fitted with a pair of end walls 14 and 16, thereby forming a closed chamber 18. The housing 12 is made of any of a number of known strong, electrically non-conductive materials, such as, for example, high-temperature plastics or ceramics, while the end walls 14, 16 are metallic plates to which electrical connections may be made. The elements are mechanically bonded together and hermetically sealed such that the chamber 18 may support a vacuum, and a moderately high electrical potential may be applied and maintained across the end walls 14 and 16.

The first end wall 14 contains a shaped cathode region 20 having an electron emissive coating (not shown) disposed on its interior surface, while the second end wall 16 is formed as a circular, slightly convex surface which is first mounted in an insulating ring 21 to form an assembly, all of which is then mated to the housing 12. In use, the end walls 14 and 16 function respectively as the cathode terminal and the collecting plate of the converter 10. Between these two walls, an electron stream 22 will flow substantially along the axis of symmetry of the cylindrical, chamber 18, originating at the cathode region 20 and terminating at the collecting plate 16.

An annular focusing element 24 is concentrically positioned within the chamber 18 at a location adjacent to the cathode 20. A baffle element 26 is concentrically positioned within the chamber 18 at a location adjacent to the collecting plate 16.

Disposed between these two elements is an induction assembly 28 comprised of a helical induction coil 30 and an elongated annular magnet 32. The coil 30 and the magnet 32 are concentrically disposed within, and occupy the central region of, the chamber 18. Referring briefly to the schematic end view of FIG. 2, the relative radial positioning of the various elements and assemblies may be seen. For clarity of presentation, the mechanical retaining means for these interiorly located elements have not been included in either figure. Focusing element 24 is electrically connected by means of a lead 34 and a hermetically sealed feed through 36 to an external source of static potential (not shown). The induction coil 30 is similarly connected via a pair of leads 38 and 40 and a pair of feed-throughs 42 and 44 to an external load element shown simply as a resistor 46.

The potentials applied to the various elements are not explicitly shown nor discussed in detail as they constitute well known and conventional means for implementing related electron stream devices. Briefly, considering (conventionally) the cathode region 20 as a voltage reference level, a high, positive voltage is applied to the collecting plate 16 and the external circuit containing this voltage source is completed by connection of its negative side to the cathode 20. This applied high, positive voltage causes the electron stream 22 which originated at the cathode region 20 to be accelerated towards the collecting plate 16 with a magnitude directly dependent upon the magnitude of the high voltage applied. The electrons impinge upon the collecting plate 16 at a velocity sufficient to cause a certain amount of ricochet. The baffle element 26 is configured and positioned to prevent these ricochet electrons from reaching the main section of the converter, and electrical connections (not shown) are applied thereto as required. A positive voltage of low to moderate level is applied to the focusing element 24 for focusing the electron stream 22 into a narrow beam. In operation, a heat source 48 (which could be derived from diverse sources such as combustion of fossil fuels, solar devices, atomic devices, atomic waste or heat exchangers from existing atomic operations) is used to heat the electron emissive coating on the cathode 20, thereby boiling off quantities of electrons. The released electrons are focused into a narrow beam by focusing element 24 and are accelerated towards the collecting plate 16. While transiting the induction assembly 28, the electrons come under the influence of the magnetic field produced by the magnet 32 and execute an interactive motion which causes an EMF to be induced in the turns of the induction coil 30. Actually, this induced EMF is the sum of a large number of individual electrons executing small circular current loops thereby developing a correspondingly large number of minute EMFs in each winding of the coil 30. Taken as a whole, the output voltage of the converter is proportional to the velocity of the electrons in transit, and the output current is dependent on the size and temperature of the electron source. The mechanism for the induced EMF may be explained in terms of the Lorentz force acting on an electron having an initial linear velocity as it enters a substantially uniform magnetic field orthogonally disposed to the electron velocity. In a properly configured device, a spiral electron path (not shown) results, which produces the desired net rate of change of flux as required by Faraday's law to produce an induced EMF.

This spiral electron path results from a combination of the linear translational path (longitudinal) due to the acceleration action of collecting plate 16 and a circular path (transverse) due to the interaction of the initial electron velocity and the transverse magnetic field of magnet 32. Depending on the relative magnitude of the high voltage applied to the collecting plate 16 and the strength and orientation of the magnetic field produced by the magnet 32, other mechanisms for producing a voltage directly in the induction coil 30 may be possible. The mechanism outlined above is suggested as an illustrative one only, and is not considered as the only operating mode available. All mechanisms, however, would result from various combinations of the applicable Lorentz and Faraday considerations.

The basic difference between the basic converter shown in U.S. Pat. No. 4,303,845 and the laser-excited converter shown in U.S. Pat. No. 4,323,808, is that the laser-excited converter collects electrons boiled off the surface of the cathode on a grid 176 having a small negative potential applied thereon by a negative potential source 178 through lead 180, which traps the electron flow and mass of electrons. The electrical potential imposed on the grid is removed, while the grid is simultaneously exposed to a laser pulse discharge from laser assembly 170, 173, 174, 20 causing a bolus of electrons 22 to be released. The electron bolus 22 is then electrically focused and directed through the interior of the air core induction coils located within a transverse magnetic field, thereby generating an EMF in the induction coil which is applied to an external circuit to perform work, as set forth above with respect to the basic thermionic converter.

As set forth above, there are numerous attendant disadvantages associated with having a collecting element simply made up of a conductive metal plate. Therefore, the present invention was developed to overcome these disadvantages and provide an improved thermionic electric converter.

Figure 3:
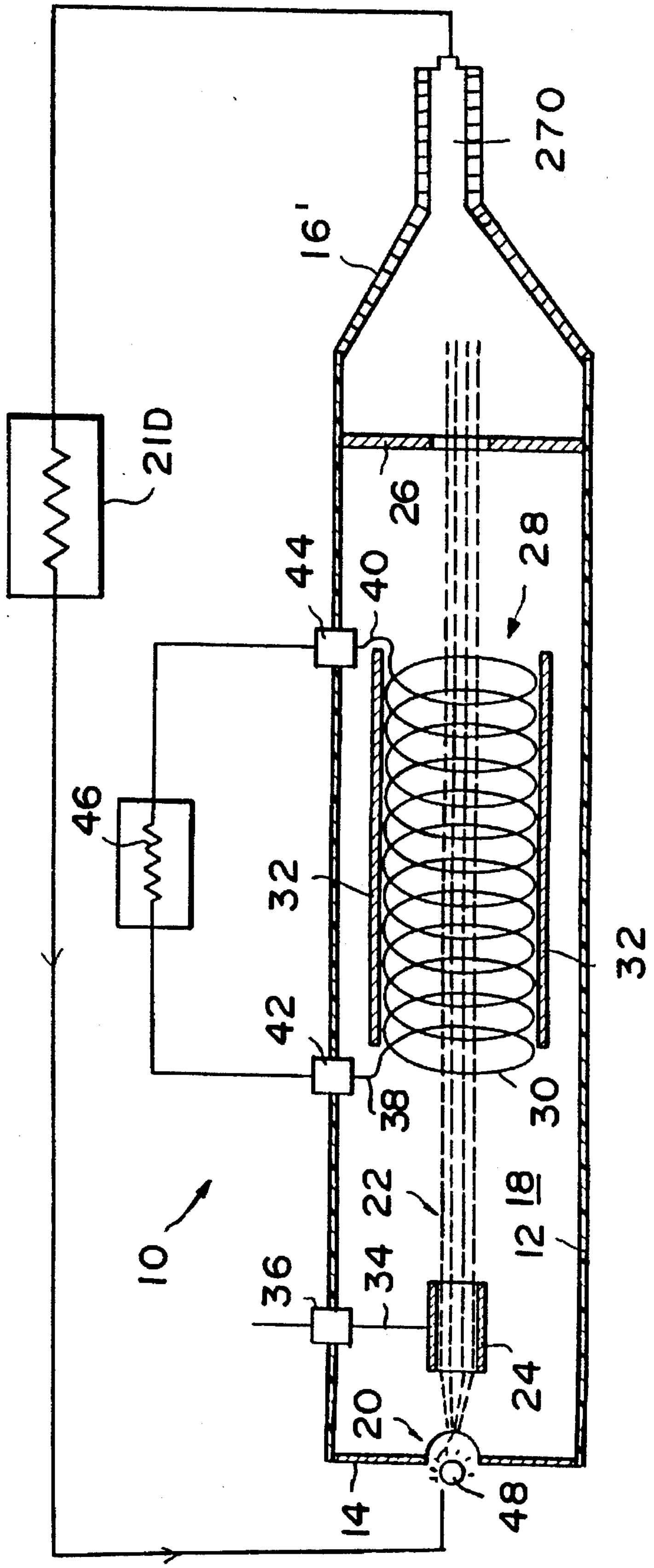
FIG. 3 is a schematic diagram of a thermionic electric converter using the collector element of the present invention.
Figure 4:
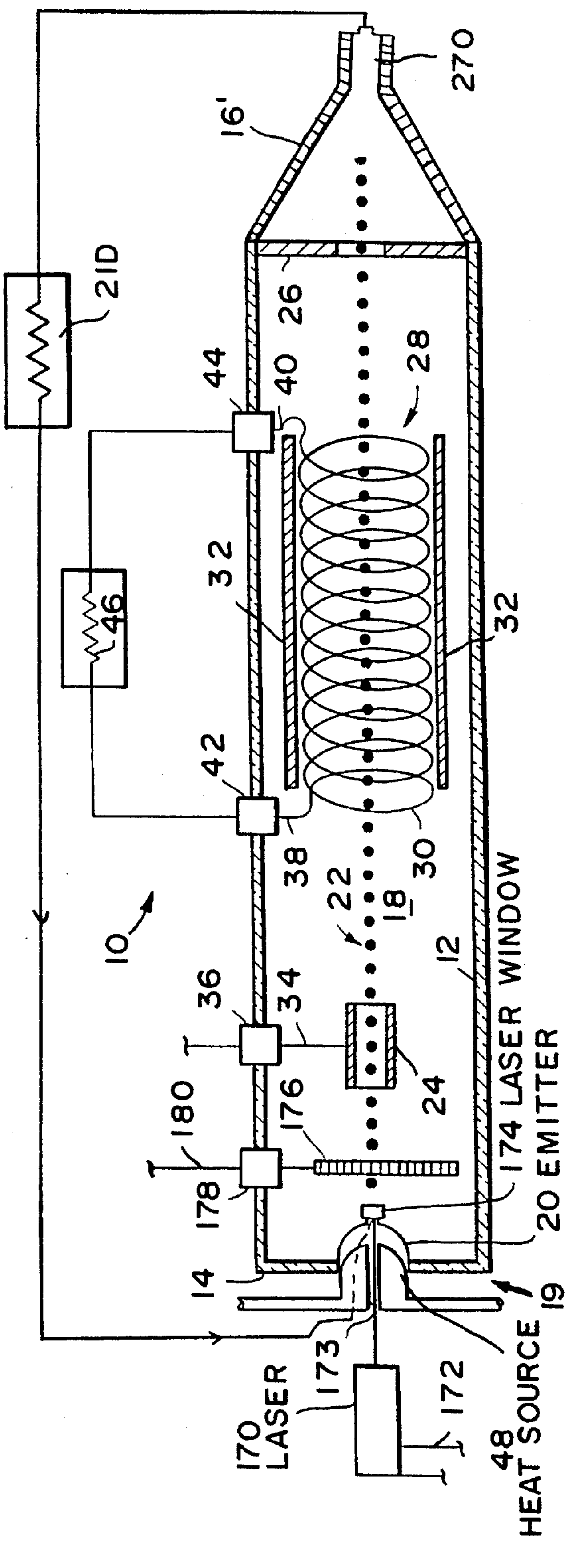
FIG. 4 is a schematic diagram of a laser-excited thermionic electric converter using the collector element of the present invention.
Figure 6:
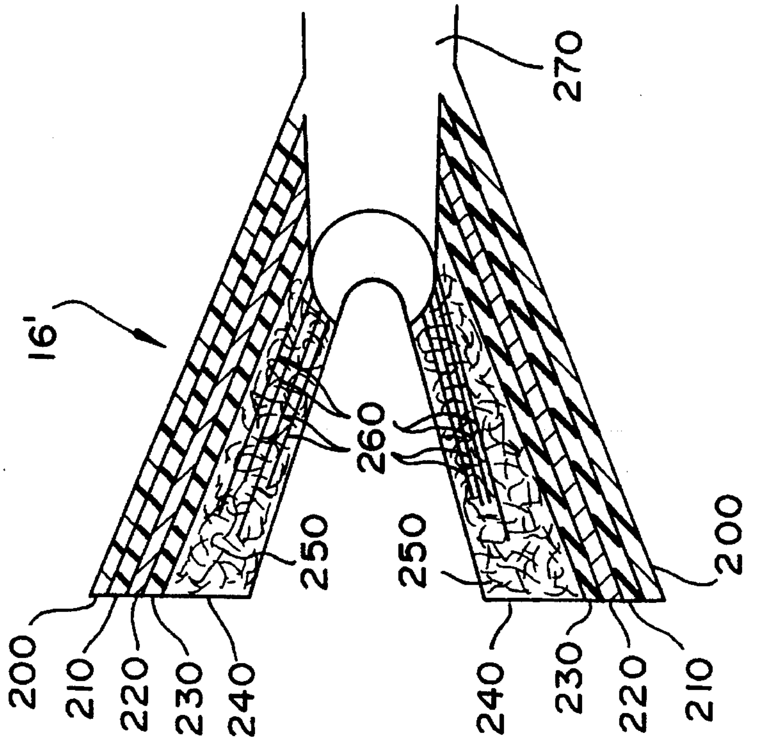
FIG. 6 is a side cross-sectional view of the collector element of the present invention.

Thermionic converters employing the collecting element, or anode, of the present invention are shown in FIGS. 3 and 4. The converters 10 essentially parallel the construction of the converters 10 shown in FIGS. 1 and 2. However, the converters 10 differ in that the collection portion 16' comprises an anode having a very different structure and improved operational characteristics. The collection element, or anode 16' shown in FIGS. 3 and 4 is shown in frontal cross-section in FIG. 5.

Figure 5:
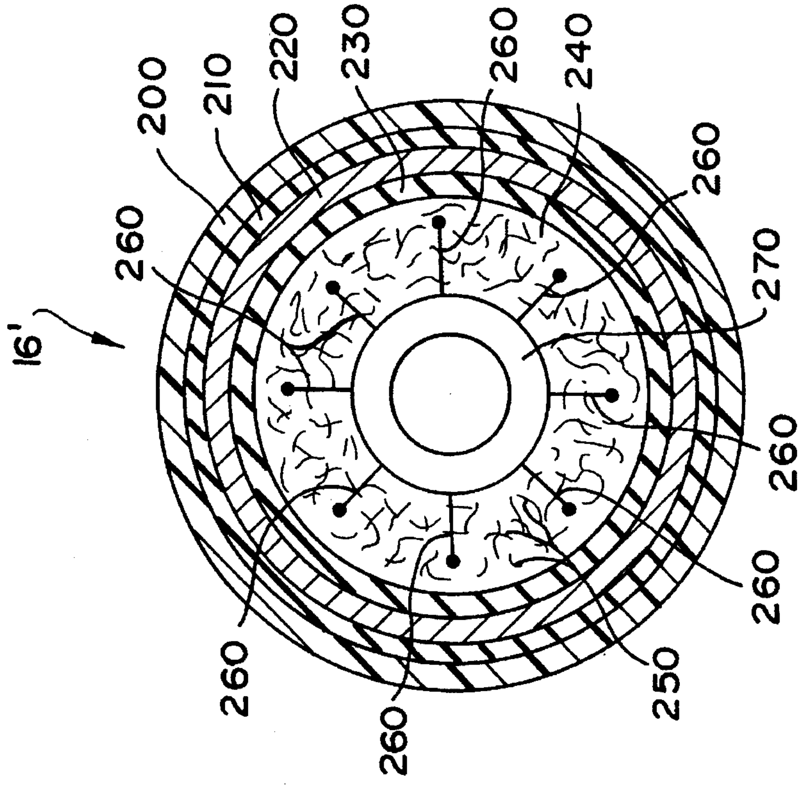
FIG. 5 is a frontal cross-sectional view of the collector element of the present invention.

With reference to FIG. 5, it can be seen that an exemplary anode 16' has a substantially circular frontal cross-section and comprises a plurality of concentric elements. The anode 16' is provided with an outer casing 200 which houses the elements that make up the anode 16'. An insulative layer 210 is disposed adjacent to the inner periphery of the outer casing 200. A charged member 220 is disposed adjacent the inner periphery of the insulative layer 210, and is further isolated from the remainder of the anode by a second insulative layer 230, which is disposed adjacent an inner periphery of the charged member 220. The materials used to form the insulator layers 210, 230, and charged member 220 can be any known material that can insulate the charged member from other elements of the collector element 16', and maintain a high static charge respectively. This construction allows the charged member 220 to be highly statically charged, while being insulated from other members of the anode, thereby enabling the charged member 220 to maintain its static charge indefinitely, and reducing its susceptibility to the adverse effects of electron scatter. The anode 16' further comprises a conductive layer 240, disposed in a layer adjacent an inner periphery of the second insulative layer 230. The material of the conductive layer 240 is chosen such that it has conductive properties similar to metal used in prior art thermionic converters, while also preventing or minimizing electron scatter. Thus, the material of the conductive layer 240 could be, for example, a copper sulfate gel. The copper sulfate gel may optionally be impregnated with copper wool fibers 250. Copper wool is similar in structure to steel wool. The copper sulfate gel 240 has the same conductive properties as the cold metal collector plate of the prior thermionic electric converters shown in FIGS. 1 and 2. However, due to the physical properties of copper sulfate, electron scatter, as exists when using a cold metal collector, is virtually eliminated. The copper wool 250 which impregnates the copper sulfate gel 240 acts to connect a plurality of buses 260 which act to collect and transmit electrical energy absorbed by the copper sulfate gel 250 to a main electrical bus 270. The main electrical bus 270 is also in electrical contact with the copper sulfate gel 240 and provides electrical energy to a circuit 21D which performs work.

Referring now to FIGS. 3 and 4, exemplary thermionic converters employing the anode 16' of the present invention are shown. Electrons, or alternatively electron boluses, 22, after their release from the cathode 20 or the grid 176, are strongly attracted to the anode region 16' of the apparatus by a highly charged member 220 which is provided with a high static charge. The highly charged member 220 is, for example, circular in configuration and is properly insulated from other elements of the apparatus by insulating layers 210, 230 in order that the highly charged member 230 may maintain its static charge indefinitely.

The electrons or electron boluses 22, momentarily after their release, are focused weakly by a negatively charged focussing member 24 to control electron scatter in the evacuated chamber 18 and to focus the electron or bolus stream 22 toward the anode portion 16'. The electrons or boluses 22 are accelerated by the charged member 230 to approach the speed of light. As the stream 22 passes through the air core induction coils 30 which are disposed in a transverse magnetic field, the stream generates an EMF in the induction coil by interaction of the electron stream with the transverse magnetic field. This EMF is used to perform electrical work on a first work element 46.

After passing through the air core induction coils 30, the electrons or boluses 22 continue to accelerate toward the highly charged member 230. After passing the highly charged static ring 230, the electrons or boluses 22 will contact the copper sulfate gel 240 of the anode region 16'. Copper sulfate gel, while having conductive properties similar to those of metallic collection plates used in prior thermionic converters, provides the additional advantageous feature of virtually eliminating any electron scatter. Electrons contacting the copper sulfate gel portion 240 of the anode 16' create an electron pressure at the anode 16' and force the electrons themselves and/or other electrons already in the anode through the external circuit 21D where work can be performed. The circuit is completed around to the cathode, where these electrons can be reheated and once again become available for acceleration to the anode 16', thus creating a continuous circuit.

In prior thermionic converters, as described above in the background section, the electrons initially contacted a cold metal member at the anode portion of the thermionic converter. Using a cold metal member caused significant electron scatter, and this could eventually destroy the space charge and eventually render the converter inoperable. The copper sulfate gel 240 of the present invention has the same conductive properties as a metal anode, and virtually eliminates electron scatter, and thus eliminates the negative effects on the operation of the converter caused by such scatter.

The copper sulfate gel 240 may also be impregnated with copper wool fibers 250 which conduct electrical energy to a plurality of ancillary buses 260. The ancillary buses 260 carry electrical energy to the main bus 270 which is also in electrical contact with the copper sulfate gel 240. The main bus 270 provides electrical energy to the external circuit 21D which performs the work. The main bus circuitry 270 may also be maintained at a "super-cooled" temperature to enhance performance and efficiency of the converter 10. Supercooling of the main bus 270 would be at temperatures that would impart superconductive properties to the bus. These temperatures can range, for example, from 0° K.–160° K.; however, any superconducting temperature range could be used.

It is understood that the anode of the present invention is equally well suited for both the basic thermionic electric converter disclosed in U.S. Pat. No. 4,303,845 as well as the laser-excited thermionic electric converter disclosed in U.S. Pat. No. 4,323,808.

While the invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the spirit and scope of the invention as defined herein and in the following claims.

What is claimed is:

1. A collector element for a thermionic electric converter comprising:

a) a casing member for housing said collector element;

b) a first insulative layer disposed adjacent to an inner periphery of said casing member;

c) a charged member disposed adjacent an inner periphery of said first insulative layer;

d) a second insulative layer disposed adjacent to an inner periphery of said charged member;

e) a conductive layer disposed adjacent to an inner periphery of said second insulative layer, said conductive layer absorbing electrons and preventing said electrons from scattering after said electrons impinge upon said conductive layer;

f) a plurality of conductive buses disposed within said conductive layer; and g) a main bus in electrical contact with said conductive layer and said plurality of buses, said main bus collecting electrical energy and providing said electrical energy to an external device.

2. The collector element of claim 1, wherein said conductive layer comprises copper sulfate gel.

3. The collector element of claim 2, wherein said conductive layer is impregnated with conductive fibers.

4. The collector element of claim 3, wherein said conductive fibers are copper wool fibers.

5. The collector element of claim 3, wherein said plurality of conductive buses are in electrical contact with said conductive fibers.

6. The collector element of claim 1, wherein said charged member is provided with a high static charge.

7. The collector element of claim 1, wherein an anode of said collector element has a circular frontal cross-section and said first insulative layer, said charged member, said second insulative layer, said conductive layer and said main bus form concentric rings of said circular cross-section.

8. An apparatus for converting heat energy directly into electrical energy comprising:

a) a cathode element having an electron emissive surface for emitting electrons in response to application of heat energy to said surface;

b) a collecting element maintained at a positive electrical potential with respect to said cathode element for attracting, accelerating and collecting said electrons;

c) an induction assembly comprised of a helical coil and means for producing a stationary transversely oriented magnetic field in an interior region of said coil;

d) an evacuated elongated container for fixedly housing said cathode element at a first end, and said collecting element at a second end, and said induction assembly at an intermediate location therein;

e) whereby said emitted electrons in accelerated transit toward said collecting element are caused to pass through said coil interior region therein individually exhibiting a minute oscillatory magnetic field action giving rise to an induced EMF in said coil; and f) wherein said collecting element has a substantially circular frontal cross section and comprises: a casing member for housing said collector element; a first insulative layer disposed adjacent to an inner periphery of said casing member; a charged member disposed adjacent an inner periphery of said first insulative layer; a second insulative layer disposed adjacent to an inner periphery of said charged member; a conductive layer disposed adjacent to an inner periphery of said second insulative layer, said conductive layer absorbing electrons and preventing said electrons from scattering after said electrons impinge upon said conductive layer; a plurality of conductive buses disposed within said conductive layer; and a main bus in electrical contact with said conductive layer and said plurality of buses, said main bus collecting electrical energy and providing said electrical energy to an external device.

9. An apparatus for converting heat and light energy directly into electrical energy comprising:

a) a cathode element having an electron emissive surface for emitting electrons in response to the application of heat energy to said surface;

b) a grid for selectively trapping said electrons;

c) a pulse laser positioned to direct a laser beam toward the trapped electrons to convert the electrons to electron boluses;

d) a collecting element maintained at a positive electrical potential with respect to said cathode element for attracting, accelerating and collecting said electron boluses;

e) an induction assembly comprised of a helical coil and means for producing a stationary transversely oriented magnetic field in an interior region of said coil;

f) an evacuated elongated container for fixedly housing said cathode element at a first end, and said collecting element at a second end, and said induction assembly at an intermediate location therein;

g) whereby said electron boluses in accelerated transit towards said collecting element are caused to pass through said coil interior region therein individually exhibiting an oscillatory magnetic field action giving rise to an induced EMF in said coil; and h) wherein said collecting element has a substantially circular frontal cross section and comprises: a casing member for housing said collector element; a first insulative layer disposed adjacent to an inner periphery of said casing member; a charged member disposed adjacent an inner periphery of said first insulative layer;

a second insulative layer disposed adjacent to an inner periphery of said charged member; a conductive layer disposed adjacent to an inner periphery of said second insulative layer, said conductive layer absorbing said electron boluses and preventing electrons from said electron boluses from scattering after said electron boluses impinge upon said conductive layer; a plurality of conductive buses disposed within said conductive layer; and a main bus in electrical contact with said conductive layer and said plurality of buses, said main bus collecting electrical energy and providing said electrical energy to an external device.

10. The collector element of claim 5, wherein said main bus is maintained at a super-cooled temperature, such that said main bus becomes superconductive.

* * * * *